(No Model.) 2 Sheets—Sheet 2.
J. H. FULTON.
HARVESTER REEL.
No. 532,320. Patented Jan. 8, 1895.
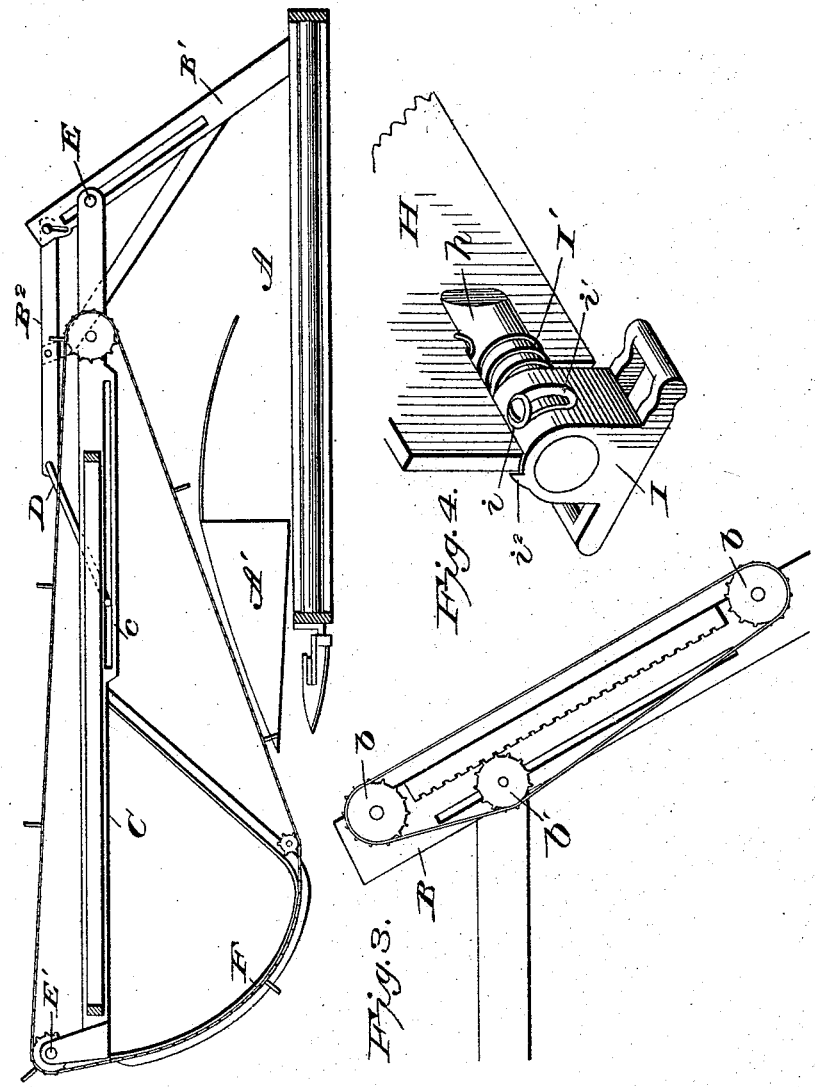

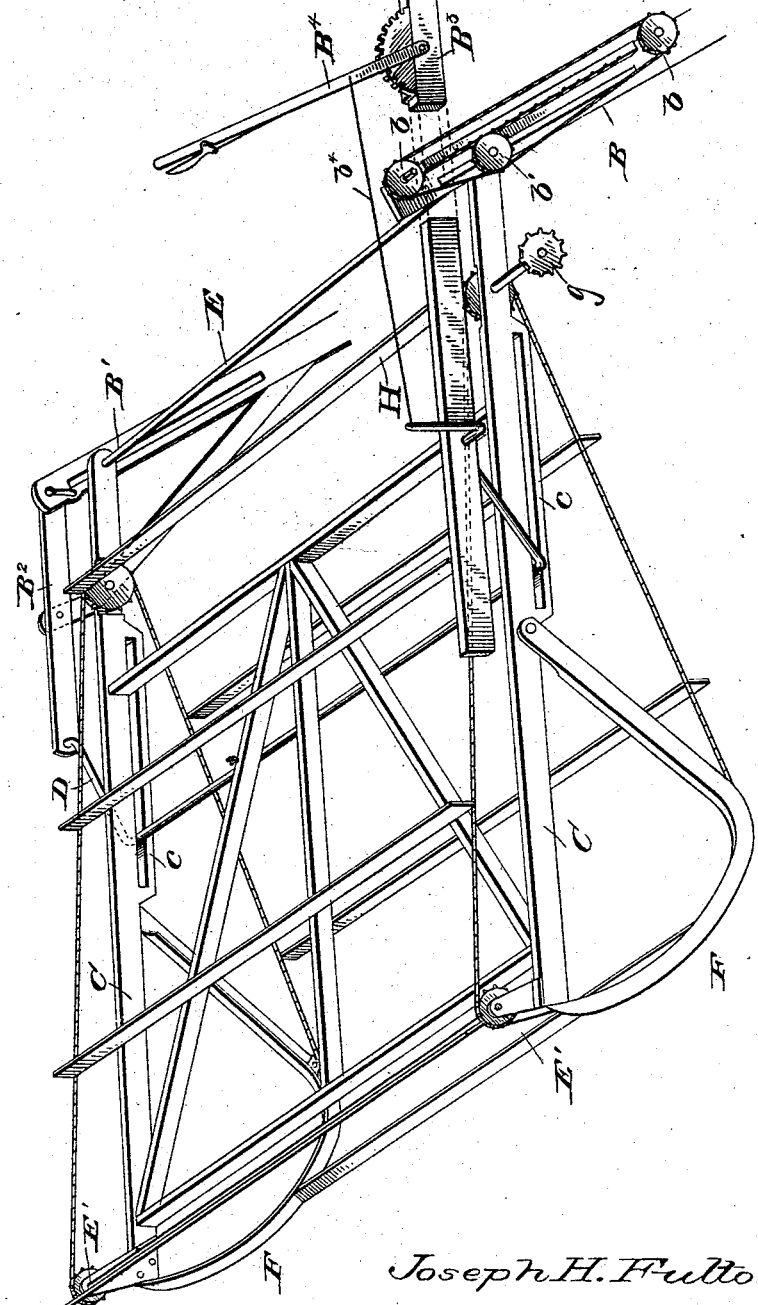

UNITED STATES PATENT OFFICE.

JOSEPH H. FULTON, OF WEST LEBANON, PENNSYLVANIA.

HARVESTER-REEL.

SPECIFICATION forming part of Letters Patent No. 532,320, dated January 8, 1895.

Application filed January 6, 1894. Serial No. 495,911. (No model.)

*To all whom it may concern:*

Be it known that I, JOSEPH H. FULTON, a citizen of the United States of America, residing at West Lebanon, in the county of Indiana and State of Pennsylvania, have invented certain new and useful Improvements in Reels for Harvesters; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to improvements in reels for grain harvesting-machines; and it consists in providing an endless slatted-belt reel device which is supported upon a suitable frame so that it may be adjusted to accommodate itself to the height of the grain, the rear end of the frame being pivotally connected to a movable bar and supported at an intermediate point by a crank-shaft which engages with the slotted side-bars of the same.

The invention also consists in the construction and arrangement of the parts whereby I am enabled to provide a reel the front portion of which has segmental guides and mechanism for moving the slats, where they first come in contact with the grain, in the segment of a circle so that the slats which contact with the grain will move the same downwardly and rearwardly, said slats moving substantially horizontally over the harvester platform after the grain contacts with the cutter-bars, as will be hereinafter fully set forth, and particularly pointed out in the claims.

In the accompanying drawings, Figure 1 is a perspective view of a harvester reel constructed in accordance with my invention. Fig. 2 is a sectional view, and Figs. 3 and 4 are detail views.

A designates the platform of the grain harvester which may be of any approved construction having on one side the shoe or divider A', the frame of the harvesting machine projecting from the side of the platform opposite the shoe.

As my improvement is adapted to different styles of harvesting machines the construction of the platform forms no part of my invention.

B and B' designate inclined uprights which are slotted the upright B being provided with sprocket-wheels $b$ $b$, the sprocket-wheels being caused to engage with their bearings so as to be held in frictional contact with the supports. A rack-plate is secured to each inclined upright and with said rack-plates engage gear-wheels $b'$ on the ends of a shaft E which passes through the slots in the inclined uprights. The inclined upright B' has attached thereto a horizontal bar $B^2$, which is suitably braced, and the outer end of this bar forms a bearing for one of the arms of the crank-shaft D the other arm of which is supported by a bar $B^3$ which projects from the frame of the harvester, and this bar $B^3$ carries a lever $B^4$ which engages with a rack also carried by the arm $B^3$, and the lever is connected by a rod $b^4$ with the bent end of the crank-shaft D, the crank-shaft being journaled in the movable bar $B^2$ on one side and in the fixed arm $B^3$ on the other side. Thus if there is any sagging of the reel frame it may be taken up by adjusting the bar $B^2$ in the slot which is formed in the upright B'.

C C designate the side bars of the reel frame which have pieces $c$ rigidly attached thereto to provide slots through which the crank-shaft D passes. The lower or rear ends of the side bars C of the reel frame are pivoted upon the transverse shaft E which extends across the platform and carries the gearwheels in engagement with the rack-plates as hereinbefore described, the gearwheel $b'$ adjacent to the driver's seat also engaging with a chain which passes over the sprocket-wheels $b$ $b$ supported by the inclined upright B, one of said sprocket-wheels being provided with a crank-handle or other means for turning the same so that the rear end of the reel frame may be raised and lowered, and when the adjustment is made the gearwheels on the shaft will engage with the rack-plates and the frictional engagement of the sprocket-wheels with the supports will retain the frame in such adjusted position. The side bars C C of the reel frame at a suitable distance in advance of the shaft E are braced by transverse bars $e$ and $e'$, and between these transverse bars are other brace-bars of any approved construction and arrangement.

F F designate belt-guides which are rigidly secured to the side bars of the reel frame and are suitably curved and braced. These belt-guides are flanged at their outer edges and provided at suitable intervals with either sprocket-wheels or rollers over which the chains to which the slats are attached pass. Sprocket-wheels or rollers are also mounted on the reel frame at suitable intervals, and at the upper end of the belt-guide is a transverse shaft E' carrying sprocket-wheels over which the endless chains pass, one of the ends of this shaft also carrying a sprocket-wheel over which passes a chain from a driven sprocket-wheel $g$ journaled on a stub-shaft supported by one of the side bars, said sprocket-wheel being connected in any suitable manner with means whereby it is driven as the harvester is drawn across the field.

The endless chains of the reel carry at suitable intervals slats or cross-bars which are attached to the links of the chain and not only serve to convey the grain to the cutter-bars but also brace the reel frame.

The bar or support $B^2$ with which one end of the crank-shaft engages is preferably pivoted to the inclined upright B' and is provided with a set-screw which passes through the slot therein for adjustably connecting the same to the inclined upright B' so as to provide a means for adjusting one end of the crank-shaft so that the reel may be brought in proper alignment with the cutter-bars should the same sag so as to get out of alignment.

H designates the slats of the reel the ends of which are provided with gudgeons $h$ on one side of which the slat is cut away to provide a passageway for the links of the endless chains. The links I have bearings or apertures into which the gudgeons $h$ of the slats pass and are retained by a suitable set-screw $i$ which passes through a slot $i'$ formed in the link. The opposite side of the link is provided with lugs or extensions $i^2$ which are adapted to abut against that part of the slat which lies over the links. A suitable spring I' is provided one end of which engages with the links and the other with the slats, said spring having a tendency to bring the slats on a vertical line with the cutter-bars and also permit movement in case the slats come in contact with an obstruction, and the movement of the slats with respect to the links is limited by the length of the slot in said links. The slat carrying links are connected to the usual sprocket links. The set-screw carried by the gudgeon and which passes through the slot in the link may be used for connecting the slats and links rigidly to each other.

A reel constructed as hereinbefore described may have attached to the cross-bars or slats thereof a strip of canvas so that it may be used as a closed reel when desired.

In a reel constructed as shown and described the slats cannot come in contact with the guards of the cutter-bar, and when the front end of the reel is elevated the slats will properly engage with tall grain so as to deposit it on the platform.

When it is desired to harvest short grain the rear shaft upon which the reel frame is mounted may be lowered and the crank-shaft turned so that the slats will move but a slight distance above the cutter-bars.

The reel can be readily raised and lowered and is much easier handled than a revolving reel, and being supported at both ends is not liable to be disorganized in use.

Having thus described my invention, what I claim as new, and desire to secure by Letters Patent, is—

1. In a reel for harvesters, the combination of a support for the reel carrying frame, said support consisting in part of bars $B^2$ and $B^3$ one of said bars being rigidly connected to the harvester frame, the other being adjustably mounted upon a fixed support B', of a crank shaft mounted in the bars $B^2$ and $B^3$ said crank shaft engaging with the side bars of the reel supporting frame, and adjusting means for the reel carrying frame mounted upon the bar $B^3$ consisting of a lever and connection which extends from the lever to the crank shaft, substantially as shown and for the purpose set forth.

2. In a reel for harvesters, the combination, of a supporting frame having a slatted reel, means for raising and lowering the rear end of the frame and a crank shaft adapted to engage with the frame at a point between its front and rear ends, and a lever carried by a rigid support and connected to the crank-shaft which engages with the reel-frame the side bars of the reel frame having curved guides, substantially as shown.

3. In a reel for harvesters, the combination with a reel and reel-frame adjustably supported by a crank-shaft, as D, of a support for the rear end of the reel frame consisting of inclined uprights with slots and rack-plates adjacent thereto, a shaft with which the rear end of the reel frame engages, said shaft carrying gearwheels which engage with the rack-plates, and means for rotating the shaft to adjust the same in its bearings, substantially as shown.

4. In a reel for harvesters, the combination, of a reel supporting frame having a slatted reel, a forwardly-inclined and slotted support for a shaft at the rear end of the reel frame, substantially as shown, so that as the rear end of the reel frame is elevated it will at the same time be moved forward, together with a crank-shaft suitably supported which passes through slots in the reel-frame, and means for rocking said crank-shaft.

5. In a reel for harvesters, the combination with a reel frame which is pivotally attached at its rear end to an adjustable shaft, having a sprocket-wheel which engages with a rack-plate and chain carried by one of the inclined supports, of a crank-shaft journaled in advance of said adjustable shaft and engaging the reel frame for raising and lowering the same, and means for turning the crank-shaft in its bearings or supports, substantially as shown and for the purpose set forth.

6. In a reel for harvesters, the combination, of a slatted reel the slats H H having gudgeons h h connected to the slats to one side of the centers thereof for eccentrically pivoting said slats to the links of the endless chains, and a fixed stop for limiting the pivotal movement of the slats in one direction, and a spring holding the slats against the fixed stop and permitting its movement away therefrom for the purpose set forth.

7. In a reel for harvesters, the combination, of the endless chains having links with projecting bearings with which the slats of the reel engage, means for limiting the pivotal movement of the slats, and springs I' which engage with the bearings formed on the links and with the slats, for the purpose set forth.

8. In a reel for harvesters, the combination, of the slats which are pivotally attached to the links of the endless chains, said slats having at their ends and to one side of their centers gudgeons which enter bearings in the links of the endless chains, the ends of the slats on one side of the gudgeons being cut away to receive the links while the ends on the other side of the gudgeons extend so that their extremities will be on a line with the outer edges of the links, substantially as shown.

In testimony whereof I affix my signature in presence of two witnesses.

JOSEPH H. FULTON.

Witnesses:
HORACE S. BEALL,
E. W. JOHNSON.